(12) United States Patent
Fukumoto et al.

(10) Patent No.: US 8,903,418 B2
(45) Date of Patent: Dec. 2, 2014

(54) INFORMATION PROCESSING APPARATUS, INFORMATION PROCESSING METHOD, AND PROGRAM

(75) Inventors: Yasutaka Fukumoto, Tokyo (JP); Takashi Ogata, Tokyo (JP); Masanori Katsu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/571,253

(22) Filed: Aug. 9, 2012

(65) Prior Publication Data
US 2013/0045752 A1 Feb. 21, 2013

(30) Foreign Application Priority Data
Aug. 16, 2011 (JP) .................. 2011-177850

(51) Int. Cl.
| | | |
|---|---|---|
| H04W 24/00 | (2009.01) | |
| H04W 4/02 | (2009.01) | |
| G01S 19/48 | (2010.01) | |
| H04W 52/02 | (2009.01) | |
| H04M 1/725 | (2006.01) | |

(52) U.S. Cl.
CPC .......... *H04W 4/026* (2013.01); *H04M 2250/06* (2013.01); *G01S 19/48* (2013.01); *H04W 52/0254* (2013.01); *H04M 2250/10* (2013.01); *H04W 52/0258* (2013.01); *H04M 2250/12* (2013.01); *H04M 1/72572* (2013.01)

USPC ......... 455/456.1; 455/574; 370/311; 370/338

(58) Field of Classification Search
USPC ........ 455/456.1–457, 572–574; 370/311, 338
See application file for complete search history.

(56) References Cited

U.S. PATENT DOCUMENTS

| | | | | |
|---|---|---|---|---|
| 5,799,256 | A * | 8/1998 | Pombo et al. ................. | 455/574 |
| 7,180,420 | B2 * | 2/2007 | Maurer ....................... | 340/572.1 |
| 8,040,219 | B2 * | 10/2011 | Haartsen et al. ............... | 340/8.1 |
| 8,130,103 | B2 * | 3/2012 | Huang et al. ................. | 340/572.4 |
| 8,145,235 | B2 * | 3/2012 | Titli et al. ................... | 455/456.1 |
| 8,195,251 | B2 * | 6/2012 | Bakthavathsalu et al. .... | 455/574 |
| 8,391,888 | B2 * | 3/2013 | Hanada et al. ............. | 455/456.1 |
| 8,417,265 | B2 * | 4/2013 | Kimishima ................ | 455/456.6 |
| 8,532,670 | B2 * | 9/2013 | Kim et al. .................. | 455/456.1 |
| 8,660,581 | B2 * | 2/2014 | Davis et al. ............... | 455/456.3 |
| 2010/0134288 | A1 * | 6/2010 | Huang et al. ............... | 340/572.1 |
| 2011/0237275 | A1 * | 9/2011 | Hanada et al. ............. | 455/456.1 |
| 2012/0040688 | A1 * | 2/2012 | Kobayashi ................. | 455/456.1 |
| 2012/0290253 | A1 * | 11/2012 | Barrett et al. ................ | 702/150 |

FOREIGN PATENT DOCUMENTS

JP 2011-81431 4/2011

* cited by examiner

*Primary Examiner* — Sharad Rampuria
(74) *Attorney, Agent, or Firm* — Sherr & Jiang, PLLC

(57) ABSTRACT

Provided is an information processing apparatus including a position sensor for detecting position information, and a detection times control unit for acquiring detection accuracy information regarding detection accuracy of the position sensor based on a detection result of the position sensor, and controlling the number of detection times of the position sensor based on the acquired detection accuracy information.

14 Claims, 17 Drawing Sheets

INFORMATION PROCESSING APPARATUS, INFORMATION PROCESSING METHOD, AND PROGRAM

BACKGROUND

The present disclosure relates to an information processing apparatus, an information processing method, and a program.

In recent years, information processing apparatuses such as mobile phones are becoming increasingly multi-functional. Therefore, a user can obtain various pieces of information by using various functions installed in an information processing apparatus. For example, some information processing apparatuses are capable of detecting position information of a user by a position sensor, and of presenting the detected position information.

JP 2011-81431A discloses a mobile terminal, having a position sensor, that is capable of detecting daily actions of a user.

SUMMARY

Now, at the time of detecting a position by a position sensor, more power is consumed than when performing detection by a motion sensor or the like. Particularly, power consumption further increases as the operation time of the position sensor becomes longer.

The present disclosure proposes a method that allows to suppress power consumed at the time of performing position detection by a position sensor.

According to the present disclosure, there is provided an information processing apparatus which includes a position sensor for detecting position information, and a detection times control unit for acquiring detection accuracy information regarding detection accuracy of the position sensor based on a detection result of the position sensor, and controlling the number of detection times of the position sensor based on the acquired detection accuracy information.

Also, according to the present disclosure, there is provided an information processing method which includes acquiring, based on a detection result of a position sensor for detecting position information, detection accuracy information regarding detection accuracy of the position sensor, and controlling, based on the acquired detection accuracy information, the number of detection times of the position sensor.

Furthermore, according to the present disclosure, there is provided a program for causing a computer to execute acquiring, based on a detection result of a position sensor for detecting position information, detection accuracy information regarding detection accuracy of the position sensor, and controlling, based on the acquired detection accuracy information, the number of detection times of the position sensor.

Furthermore, according to the present disclosure, the number of detection times of the position sensor can be reduced in a case detection accuracy is low, for example, by controlling the number of detection times of the position sensor based on the acquired detection accuracy information. As a result, power consumption at the time of performing position detection by the position sensor can be suppressed.

As described above, according to the present disclosure, power consumed at the time of performing position detection by a position sensor can be suppressed.

DETAILED DESCRIPTION OF THE EMBODIMENT(S)

Figure 1:
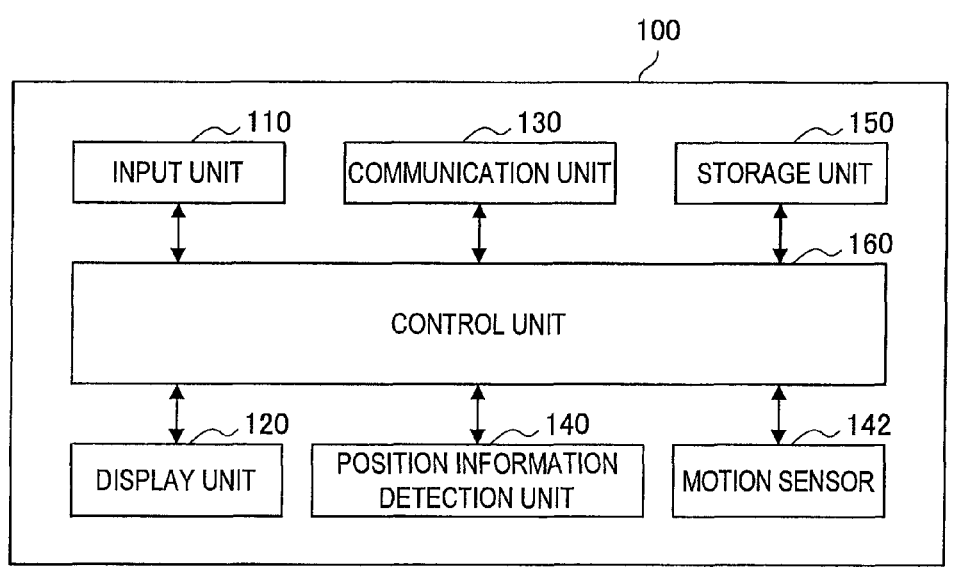
FIG. 1 is a diagram showing a configuration of an information processing apparatus according to a first embodiment.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Additionally, the explanation will be given in the following order.

1. First Embodiment
   1-1. Overview of Information Processing Apparatus
   1-2. Configuration of Action Recognition Engine 1-3. Acquisition Times Control Process for Position Information
1-4. Operation of Information Processing Apparatus
2. Second Embodiment
3. Third Embodiment
4. Fourth Embodiment
5. Fifth Embodiment

1. First Embodiment

1-1. Overview of Information Processing Apparatus

An overview of an information processing apparatus 100 according to a first embodiment of the present disclosure will be described with reference to FIG. 1. FIG. 1 is a diagram showing a configuration of the information processing apparatus 100 according to the first embodiment.

The information processing apparatus 100 is a mobile terminal to be used by a user, such as a mobile phone, a PDA or the like, for example. The information processing apparatus 100 has a function of displaying map information on a screen, and selecting peripheral information or the like.

As shown in FIG. 1, the information processing apparatus 100 includes an input unit 110, a display unit 120, a communication unit 130, a position information detection unit 140, a motion sensor 142, a storage unit 150, and a control unit 160.

The input unit 110 has a function of receiving input of operation information from a user of the information processing apparatus 100. The input unit 110 is configured from an input device such as a switch, a button, a touch panel, a keyboard, a mouse, or the like.

The display unit 120 has a function of displaying various types of information under the control of the control unit 160. For example, the display unit 120 displays map information. The display unit 120 is configured from a display device such as a liquid crystal display, a plasma display, an organic EL display, or the like.

The communication unit 130 is a communication interface having a function of a transmission unit and a reception unit for performing communication with an external appliance under the control of the control unit 160. The communication unit 130 is configured from a communication device such as a wired or wireless LAN, a Bluetooth communication card, a communication router, a communication modem, or the like.

The position information detection unit 140 is a global positioning system (GPS) receiver, for example, and detects position information (information on latitude, longitude and the like) of the information processing apparatus 100 by performing wireless communication with an external appliance. For example, the GPS receiver receives data indicating orbit information, time information and the like from a plurality of GPS satellites, and detects the position of the information processing apparatus 100 based on the difference between pieces of information indicated by the data, difference between data arrival times, or the like. Additionally, the position information detection unit 140 is not limited to be the GPS receiver. For example, the position information detection unit 140 may detect the position of the information processing apparatus 100 by receiving radio frequency identification (RFID) or information from a Wi-Fi access point. Furthermore, the position information detection unit 140 may detect the position of the information processing apparatus 100 by receiving, for example, data indicating information regarding a cell in whose service area the information processing apparatus 100 is present, from a base station device of a mobile phone network of the information processing apparatus 100 (a mobile phone).

The motion sensor 142 detects information regarding movement or state of the information processing apparatus 100. As the motion sensor 142, a 3-axis accelerometer (an accelerometer, a gravity sensor, a fall detection sensor, or the like) or a 3-axis gyro sensor (an angular velocity sensor, a hand-blur correction sensor, a geomagnetic sensor, or the like) is used, for example.

The storage unit 150 has a function of storing various types of information to be used by the control unit 160. For example, the storage unit 150 stores position information acquired by the position information detection unit 140, action information acquired by the motion sensor 142, and the like. The storage unit 150 is configured from a storage device such as a magnetic storage device, a semiconductor storage device, an optical storage device, or the like.

The control unit 160 has a function of controlling the overall operation of the information processing apparatus 100. For example, the control unit 160 can control operation of the information processing apparatus 100 based on operation information output from the input unit 110, position information acquired by the position information detection unit 140, action information acquired by the motion sensor 142, or the like. The control unit 160 is configured from a CPU, a ROM, and a RAM.

1-2. Configuration of Action Recognition Engine

Figure 2:
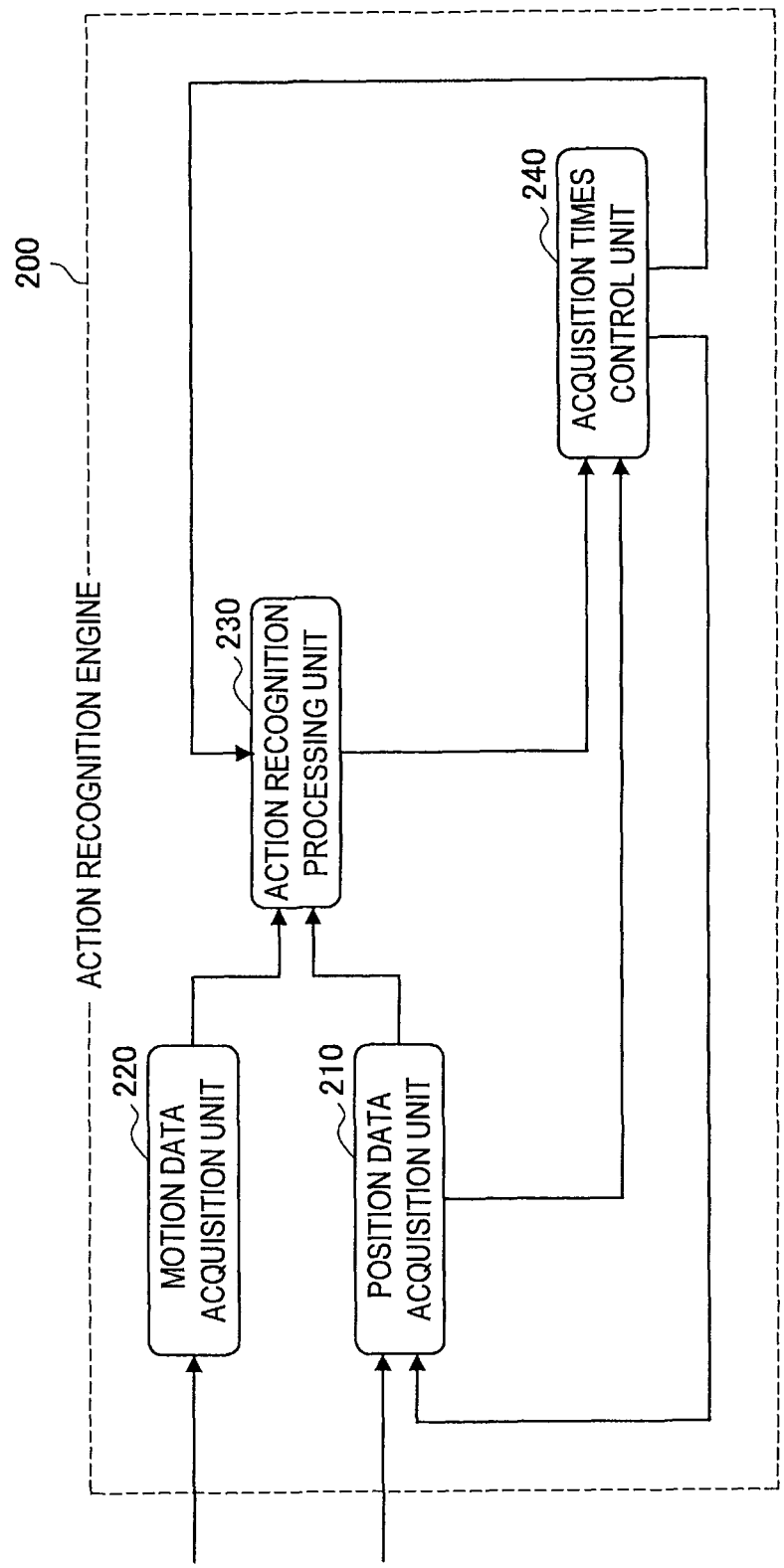
FIG. 2 is a block diagram showing a configuration of an action recognition engine of the information processing apparatus according to the first embodiment.

A configuration of an action recognition engine 200 of the information processing apparatus 100 according to the first embodiment will be described with reference to FIG. 2. FIG. 2 is a block diagram showing a configuration of the action recognition engine 200 of the information processing apparatus 100 according to the first embodiment.

As shown in FIG. 2, the action recognition engine 200 includes a position data acquisition unit 210, a motion data acquisition unit 220, an action recognition processing unit 230, which is an example of an action recognition unit, and an acquisition times control unit 240, which is an example of a detection times control unit. Additionally, these functional units are realized by the control unit 160 shown in FIG. 1.

The position data acquisition unit 210 acquires position data of the information processing apparatus 100 (user). The position data acquisition unit 210 acquires the position data of the information processing apparatus 100 based on position information detected by the position information detection unit 140. For example, the position data acquisition unit 210 acquires current position information of the information processing apparatus 100 (user). The position data acquisition unit 210 outputs the position data acquired to the action recognition processing unit 230 and the acquisition times control unit 240.

The motion data acquisition unit 220 acquires motion data regarding movement or state of the information processing apparatus 100. The motion data acquisition unit 220 acquires the motion data regarding movement or state of the information processing apparatus 100 based on information detected by the motion sensor 142. The motion data acquisition unit 220 outputs the motion data acquired to the action recognition processing unit 230.

The action recognition processing unit 230 recognizes an action of a user carrying the information processing apparatus 100. The action recognition processing unit 230 recognizes the action of the user of the information processing apparatus 100 based on position data input from the position data acquisition unit 210 and motion data input from the motion data acquisition unit 220, and acquires action information of the user.

The acquisition times control unit 240 acquires detection accuracy information regarding detection accuracy of the position information detection unit 140 based on a detection result of the position information detection unit 140 (a position sensor), and controls the number of acquisition times (the number of detection times) of the position information of the position information detection unit 140 based on the detection accuracy information acquired. For example, the acquisition times control unit 240 increases the number of acquisition times by reducing acquisition cycle of the position information, and reduces the number of acquisition times by increasing the acquisition cycle of the position information. Although details will be described later, it thereby becomes possible to suppress power consumed at the time of performing position detection by the position sensor.

The acquisition times control unit 240 may divide detection accuracy whose degrees cover a predetermined range, and may control the number of position detection times for each of the divided degrees. For example, the acquisition times control unit 240 may perform control so as to reduce stepwise the number of position detection times for a region, within the predetermined range, with a high degree of detection accuracy. Also, the acquisition times control unit 240 may perform control so as to reduce stepwise the number of position detection times for a region, within the predetermined range, with a low degree of detection accuracy. Furthermore, in the case the predetermined range is divided into a small region, a medium region, and a large region according to the degree, the acquisition times control unit 240 may control the number of position detection times for the medium region to be greater than the number of position detection times for the small region and the large region. By controlling the number of position detection times for each degree of detection accuracy in this manner, optimal number of position detection times according to the situation the user is in can be set. As a result, power consumed at the time of position detection can be suppressed without impairing the function of position detection.

1-3. Acquisition Times Control Process for Position Information

Figure 3:
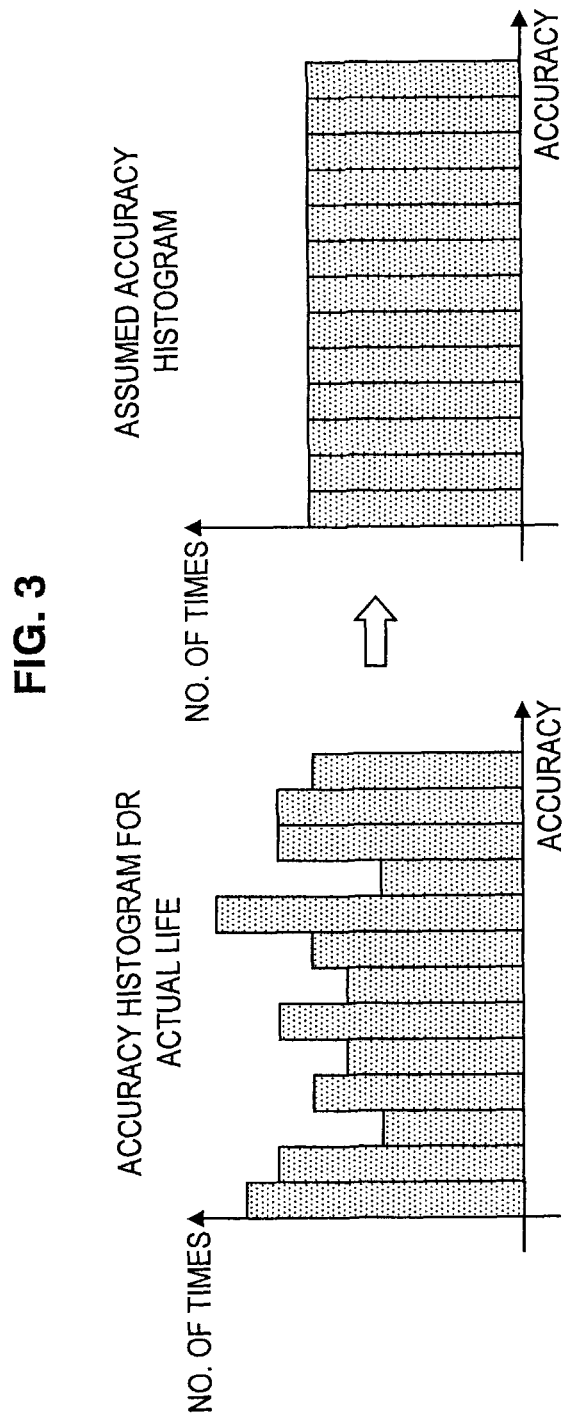
FIG. 3 is a histogram showing a relationship between accuracy of a position sensor and the number of acquisition times.

FIG. 3 is a histogram showing a relationship between accuracy of the position sensor and the number of acquisition times. In daily life, a user goes to various places indoors and outdoors. Accordingly, when looking at the actions of the user over a short period of time, the distribution of the histogram is not uniform, as shown in the left diagram of FIG. 3.

On the other hand, when looking at the actions of the user over a long period of time, the histogram of the accuracy of the position sensor can be assumed to be uniformly distributed, as shown in the right diagram of FIG. 3. Here, the center of the histogram indicates the average number of acquisition times of the position data and the average accuracy. The acquisition times control unit 240 according to the present embodiment controls the number of acquisition times based on the accuracy of the position sensor so that the center of the histogram shifts to a preferable position.

Figure 4:
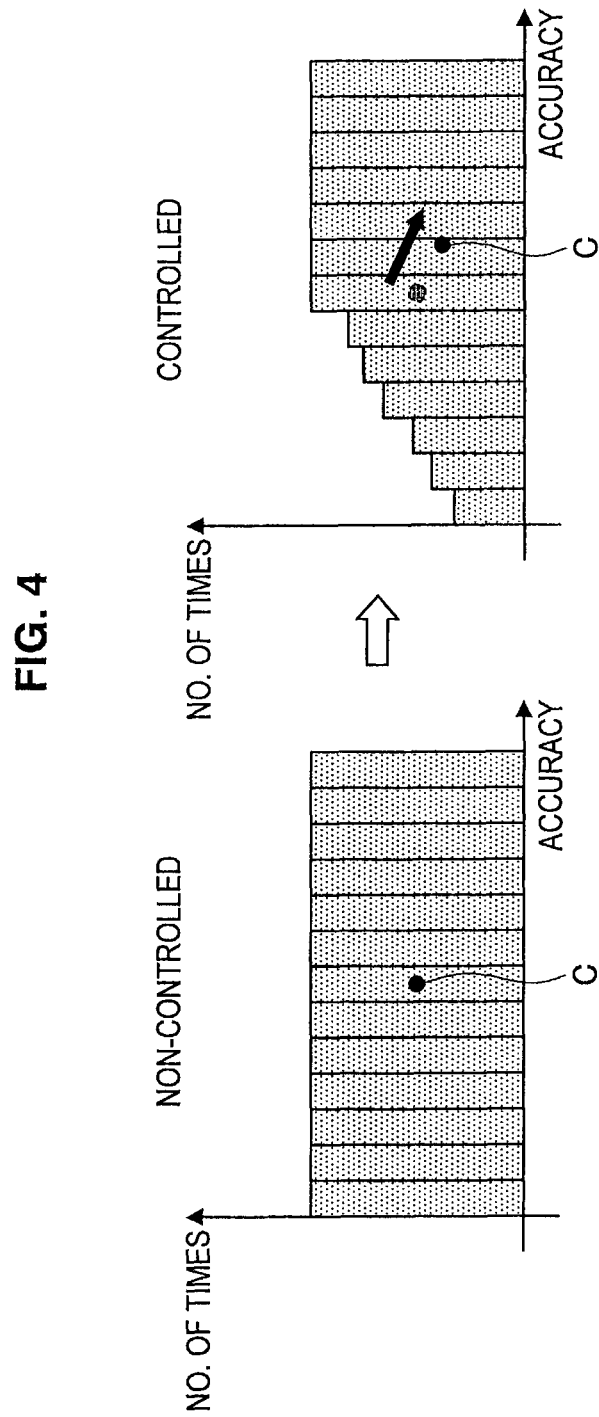
FIG. 4 is a schematic diagram showing a first example of an acquisition times control process.

FIG. 4 is a schematic diagram showing a first example of the acquisition times control process. As shown in FIG. 4, the acquisition times control unit 240 performs control so as to reduce the number of acquisition times for parts where the accuracy of the histogram is low. Specifically, the acquisition times control unit 240 reduces stepwise the number of acquisition times as the accuracy falls. That is, the acquisition times control unit 240 reduces stepwise the number of acquisition times by increasing stepwise the acquisition cycle. As a result, the center C of the accuracy histogram shifts to the lower right. The overall number of acquisition times is thereby reduced, and, also, the average accuracy is increased.

By reducing the number of acquisition times at parts where the accuracy is low in this manner, power consumption can be effectively suppressed. Also, influence on position detection is small even if the number of acquisition times is reduced for where the accuracy is low. Thus, according to the first example, power consumption can be suppressed without reducing the accuracy of position detection.

Figure 5:
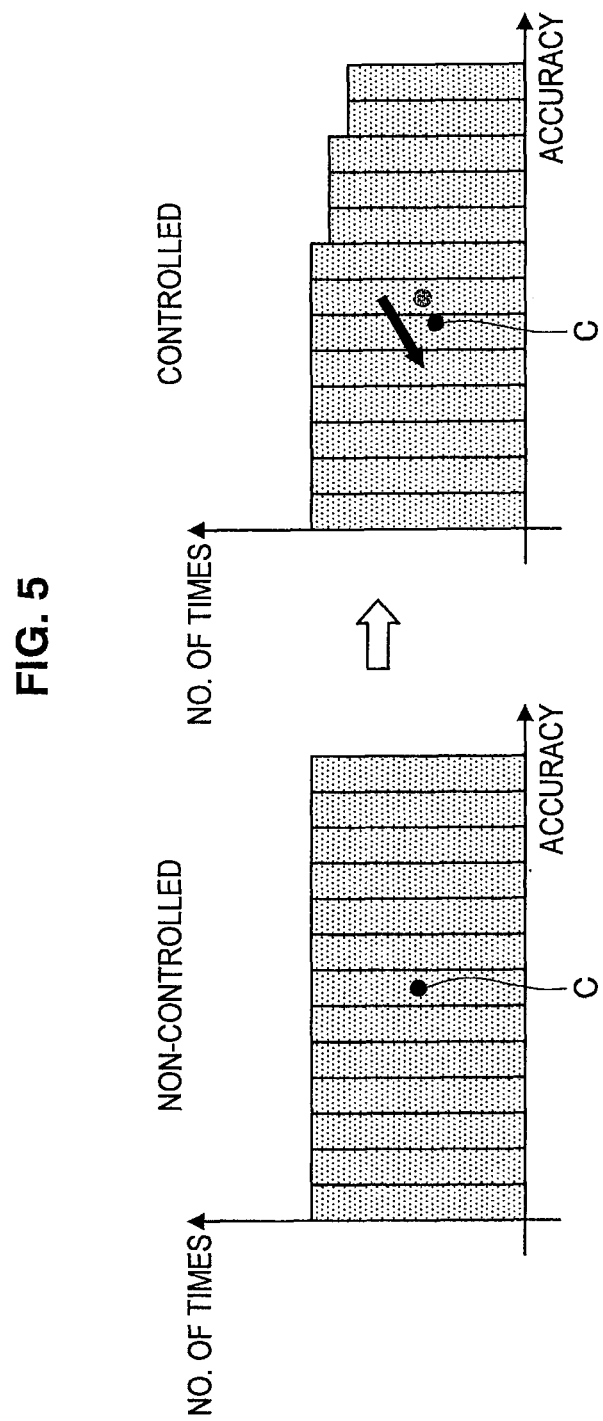
FIG. 5 is a schematic diagram showing a second example of the acquisition times control process.

FIG. 5 is a schematic diagram showing a second example of the acquisition times control process. As shown in FIG. 5, the acquisition times control unit 240 performs control so as to reduce the number of acquisition times for parts where the accuracy of the histogram is high. Specifically, the acquisition times control unit 240 reduces stepwise the number of acquisition times as the accuracy increases. That is, the acquisition times control unit 240 reduces stepwise the number of acquisition times by increasing stepwise the acquisition cycle. Additionally, the number of acquisition times is reduced less drastically than in the first example. As a result, the center C of the accuracy histogram shifts to the lower left. The overall number of acquisition times is thereby reduced.

By reducing the number of acquisition times at parts where the accuracy is high in this manner, power consumption can be effectively suppressed. Also, when the number of acquisition times is reduced for parts where the accuracy is high, the average accuracy is reduced, but the influence on position detection is small. This is because, since the accuracy of each piece of data is high at parts where the accuracy is high, the accuracy which has been averaged is barely changed even when the number of pieces of data used for averaging is small.

Figure 6:
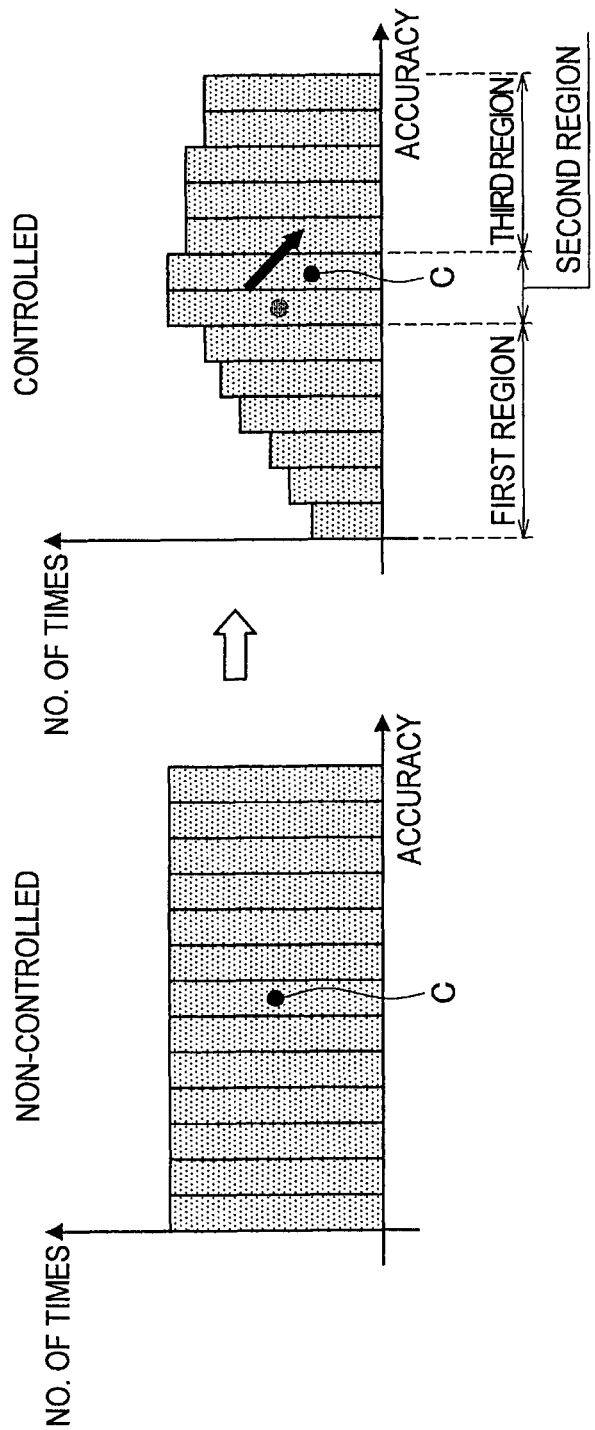
FIG. 6 is a schematic diagram showing a third example of the acquisition times control process.

FIG. 6 is a schematic diagram showing a third example of the acquisition times control process. The third example is a process which combines the first example and the second example described above. That is, the acquisition times control unit 240 reduces stepwise the number of acquisition times as the accuracy falls, and, also, reduces stepwise the number of acquisition times as the accuracy increases. As a result, the center C of the accuracy histogram shifts to the lower right. Power consumption can be effectively suppressed while hardly impairing the accuracy of position detection.

Describing in detail with reference to FIG. 6, the number of acquisition times is reduced stepwise in a first region (a region with low accuracy; corresponds to the small region) and a third region (a region with high accuracy; corresponds to the large region) on the horizontal axis. Additionally, the number of acquisition times in the third region is larger than the number of acquisition times in the first region. Also, in a second region (corresponding to the medium region) between the first region and the third region, the number of acquisition times is constant and is not reduced. This is because, since the accuracy of the second region is lower compared to the accuracy of the third region, it is difficult, in the averaging process of position detection, to reduce the number of acquisition times if the processing accuracy is to be improved.

Figure 7:
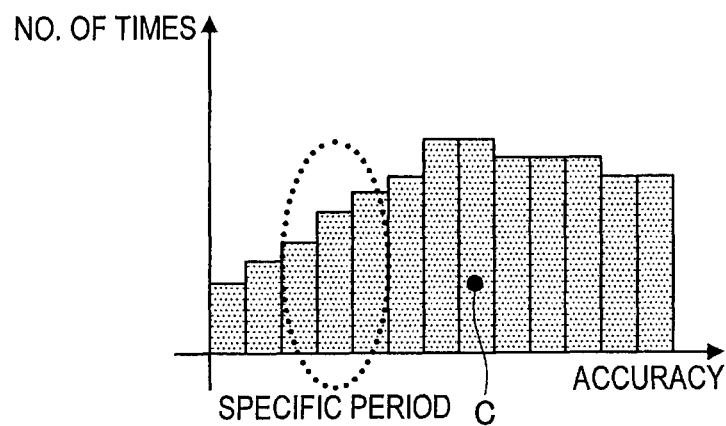
FIG. 7 is a diagram for describing the third example of the acquisition times control process.

FIG. 7 is a diagram showing the third example of the acquisition times control process. For example, if a user is staying at a location where the accuracy is low, position information with low accuracy is acquired at the specific period of the stay. Thus, by performing the above-described control in advance, the number of acquisition times of position information with low accuracy can be reduced, and, consequently, power consumption can be suppressed.

Figure 8:
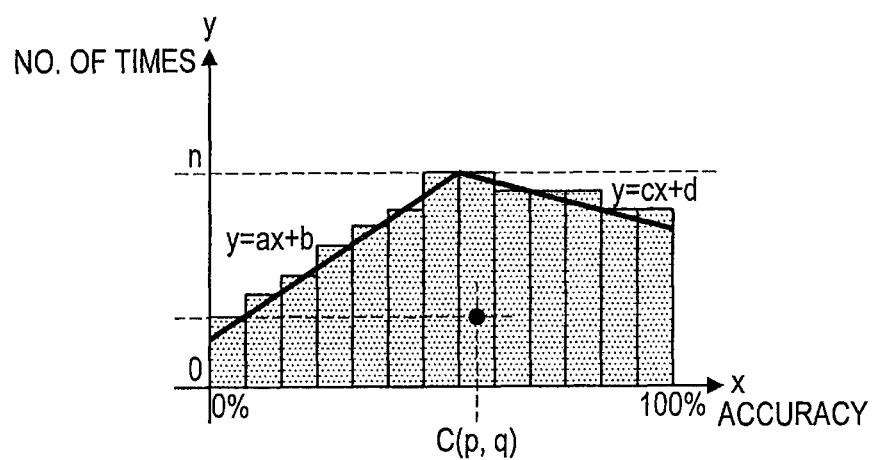
FIG. 8 is a schematic diagram for describing an example modification of the acquisition times control process.

FIG. 8 is a schematic diagram for describing an example modification of the acquisition times control process. The acquisition times control unit 240 may regard the number of acquisition times as a function of the accuracy, and control the position of the center C of the accuracy histogram. For example, as shown in FIG. 8, the accuracy histogram may be approximated by a linear function in such a manner as the following Equations (1) and (2).

$$y=ax+b \qquad \text{Equation (1)}$$

$$y=cx+d \qquad \text{Equation (2)}$$

Moreover, a, b, c, and d are constant terms.

For example, if the constant terms a to d are decided according to a target distribution, the center C (p, q) of the accuracy histogram is decided. Accordingly, by calculating and dynamically evaluating how the centre C will be positioned when the constant terms a to d are changed, it becomes possible to control the center C. The position of the center of the accuracy histogram can thereby be controlled with higher accuracy.

Figure 9:
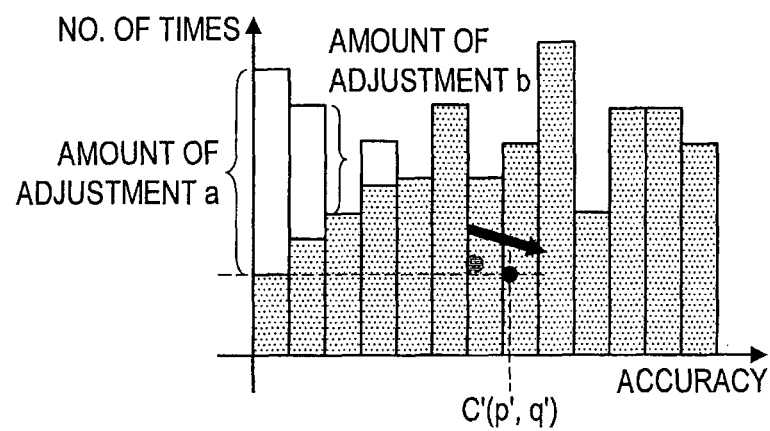
FIG. 9 is a schematic diagram for describing an example modification of the acquisition times control process.

FIG. 9 is a schematic diagram for describing an example modification of the acquisition times control process. The acquisition times control unit 240 may calculate the histogram from the record of the actual position data, and may perform control so that the center shifts to the optimal position. Such a process is effective when it is difficult to assume a uniformly distributed histogram. As shown in FIG. 9, the acquisition times control unit 240 controls the center of the histogram by taking into account the relationship of amounts of adjustment a and b and the center C' (p', q') after shifting.

Figure 10:
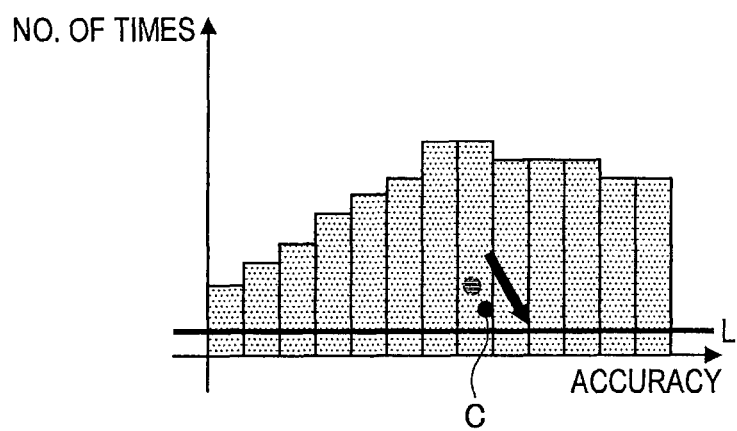
FIG. 10 is a schematic diagram for describing an example modification of the acquisition times control process.

FIG. 10 is a schematic diagram for describing an example modification of the acquisition times control process. With the control process described above, the position of the center is inclined to go down. Accordingly, as shown in FIG. 10, the acquisition times control unit 240 may set a lower limit (a bottom line L) for the center C and perform control so that the center C does not fall below the lower limit. Additionally, the lower limit is the number of position detection times necessary for the action recognition process, for example.

1-4. Operation of Information Processing Apparatus

An operation of the information processing apparatus 100 at the time of performing the acquisition times control process according to the first embodiment will be described with reference to FIG. 11.

Figure 11:
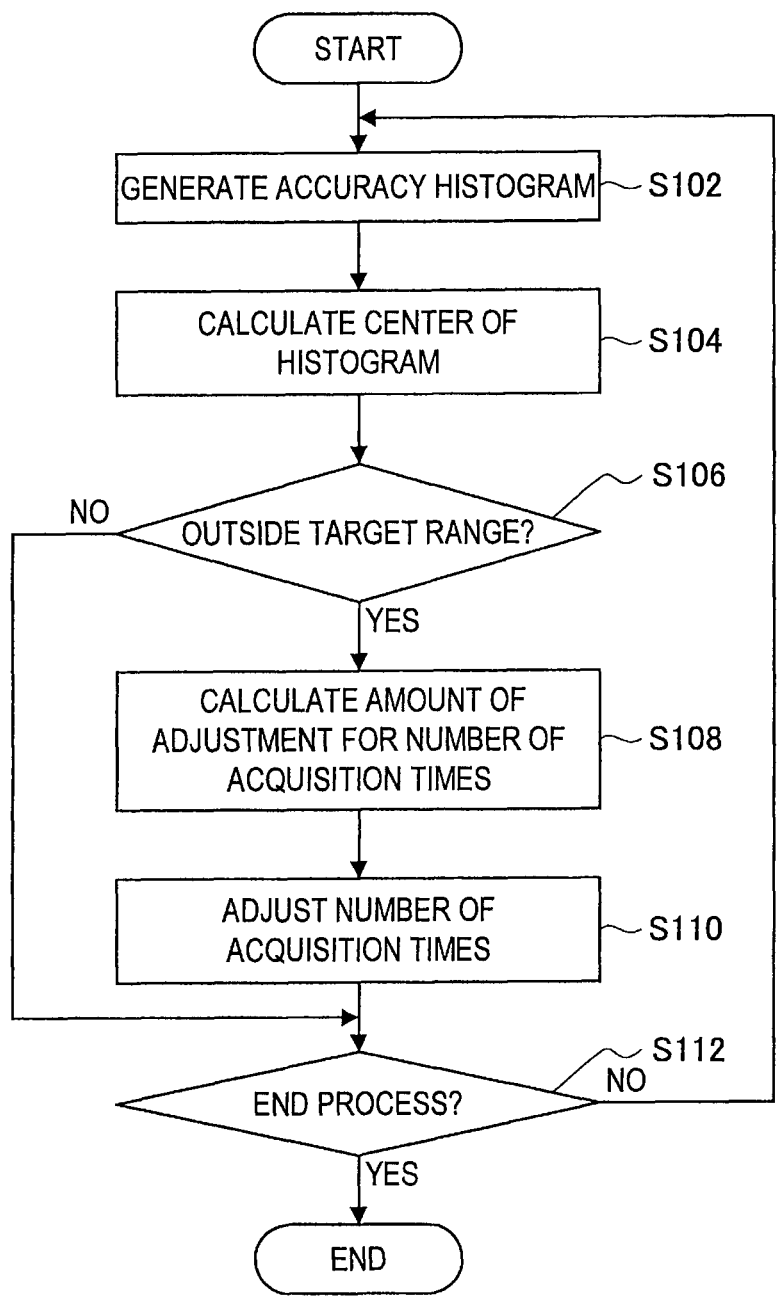
FIG. 11 is a flow chart showing an operation of the information processing apparatus at the time of performing the acquisition times control process according to the first embodiment.

FIG. 11 is a flow chart showing an operation of the information processing apparatus 100 at the time of performing the acquisition times control process according to the first embodiment. This flow chart starts from the activation of the position information detection unit 140, for example.

The acquisition times control process is realized by the CPU of the control unit 160 executing a program stored in the ROM. Additionally, the program to be executed may be stored in a recording medium such as a compact disk (CD), a digital versatile disk (DVD), a memory card or the like, or may be downloaded from a server or the like via the Internet.

First, the acquisition times control unit 240 generates an accuracy histogram as shown in FIG. 4 and the like (step S102). Then, the acquisition times control unit 240 calculates the center C of the histogram (step S104).

Next, the acquisition times control unit 240 determines whether the calculated center is outside a target range (step S106). In the case the center is outside the target range (the target range is set in advance) in step S106 (Yes), the acquisition times control unit 240 calculates the amount of adjustment with respect to the number of acquisition times (step S108). For example, the acquisition times control unit 240 calculates, as the amount of adjustment, the amount of adjustment of the acquisition cycle.

Next, the acquisition times control unit 240 adjusts the number of acquisition times according to the amount of adjustment calculated (step S110). For example, the acquisition times control unit 240 performs control so as to reduce the number of acquisition times, as shown in FIGS. 4 to 6 and the like. Additionally, in the case the center is within the target range in step S106 (No), the acquisition times control unit 240 does not adjust the number of acquisition times.

Then, the acquisition times control unit 240 repeats the processes described above (steps S102 to S110) until the present process is complete (step S112: No). When the present process is complete (step S112: Yes), the position information detection unit 140 (a position sensor) detects position information according to the controlled number of acquisition times.

According to the first embodiment described above, the number of detection times of the position information detection unit 140 can be reduced in a case the detection accuracy is low, for example, by controlling number of the detection times of the position information detection unit 140 based on the acquired detection accuracy information. As a result, power consumption at the time of performing position detection by the position information detection unit 140 can be suppressed.

2. Second Embodiment

An information processing apparatus 100 according to a second embodiment includes a plurality of position sensors (position information detection units 140), and can select and use a plurality of position sensors. The information processing apparatus 100 can maintain the accuracy while keeping down the number of acquisition times, by operating a position sensor while taking into account the characteristics or performance (detection performance) of a plurality of position sensors.

Figure 12:
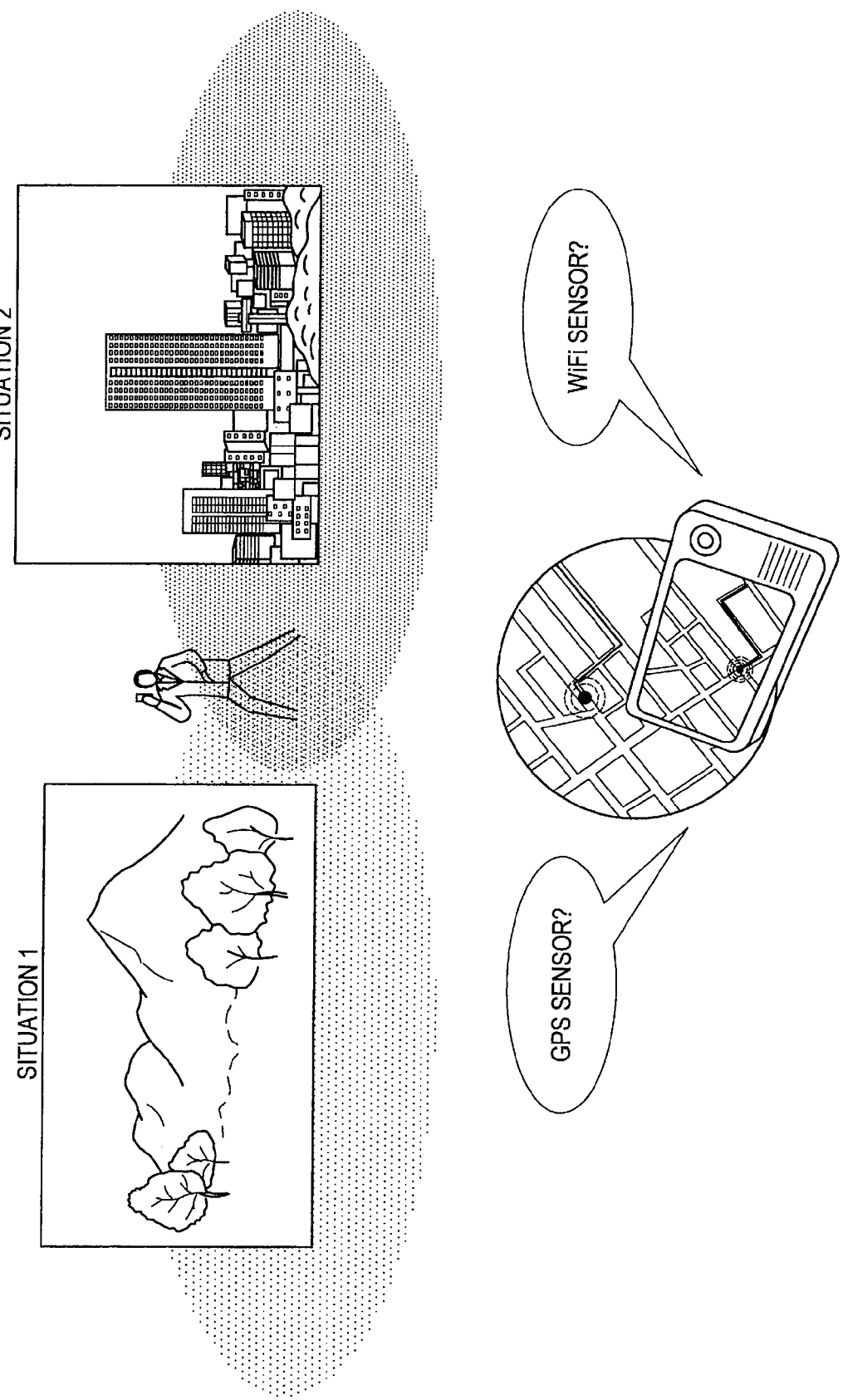
FIG. 12 is a schematic diagram for describing an overview of an acquisition times control process with respect to position information according to a second embodiment.

An acquisition times control process with respect to position information according to the second embodiment will be described with reference to FIG. 12. FIG. 12 is a schematic diagram for describing an overview of an acquisition times control process with respect to position information according to the second embodiment.

In the following, an explanation will be given assuming that a plurality of position sensors are a GPS sensor (corresponding to a first position sensor) and a WiFi sensor (corresponding to a second position sensor). The acquisition times control unit 240 performs scoring and comparison of the characteristics or performance (detection performance) of the GPS sensor and the WiFi sensor, and selects a sensor suitable for the situation the user is in and causes the same to operate. For example, as shown in FIG. 12, when the user is in the environment of a situation 1, the acquisition times control unit 240 selects the GPS sensor and causes the same to operate, and when the user is in the environment of a situation 2, the acquisition times control unit 240 selects the WiFi sensor and causes the same to operate.

Here, the characteristics or performance of the GPS sensor or the WiFi sensor can be evaluated based on the standpoints of, for example, the power consumption per unit time of the position sensor, the length of a section of the latest acquired position data, and the average value of the accuracy of the latest acquired position data. The GPS sensor and the WiFi sensor can then be compared to each other by performing scoring with respect to the three standpoints by the following Equation (3), for example.

$$S=aX+bY+cZ \qquad \text{Equation (3)}$$

"S" is a device selection score. "a", "b", and "c" are coefficients, and the coefficient a is a negative value, and the coefficients b and c are positive values, for example. "X" is a value obtained by normalizing the power consumption per unit time of the sensor, "Y" is a value obtained by normalizing the length of a section of the latest acquired position data, and "Z" is a value obtained by normalizing the average value of the accuracy of the latest acquired position data.

The acquisition times control unit 240 then compares the device selection score S(gps) of the GPS sensor and the device selection score S(wifi) of the WiFi sensor, and selects a sensor with a higher score. It thereby becomes possible to select, reflecting the characteristics or performance of the position sensors, the most appropriate position sensor from a plurality of position sensors and cause the same to operate.

Now, in the case of alternately, or simultaneously, causing the GPS sensor and the WiFi sensor to operate to calculate the device selection scores S(gps) and S(wifi), influence on the power consumption is an issue of concern. Thus, the device selection scores S(gps) and S(wifi) may be compiled as a database in advance. For example, the device selection scores S(gps) and S(wifi) may be stored in the storage unit 150. In similar places or times, the characteristics or performance of the GPS sensor and the WiFi sensor tend to have similar values. By using this tendency and selecting the GPS sensor or the WiFi sensor using known score values for similar places or time periods, the computation amount after database compilation is reduced and power consumption can be suppressed.

Furthermore, in the case the device selection scores S(gps) and S(wifi) are below a predetermined threshold value, the GPS sensor and the WiFi sensor may both be controlled so as not to operate for a predetermined period of time. When considering the movement speed at the time of a user taking an action, in the case the device selection scores are below the predetermined threshold value, the scores are assumed to remain low for a while. Thus, while the scores are low, there is virtually no influence on position detection even if the GPS sensor and the WiFi sensors do not operate. By not causing the GPS sensor and the WiFi sensor to operate for a predetermined period of time, power consumption can be reduced.

Figure 13:
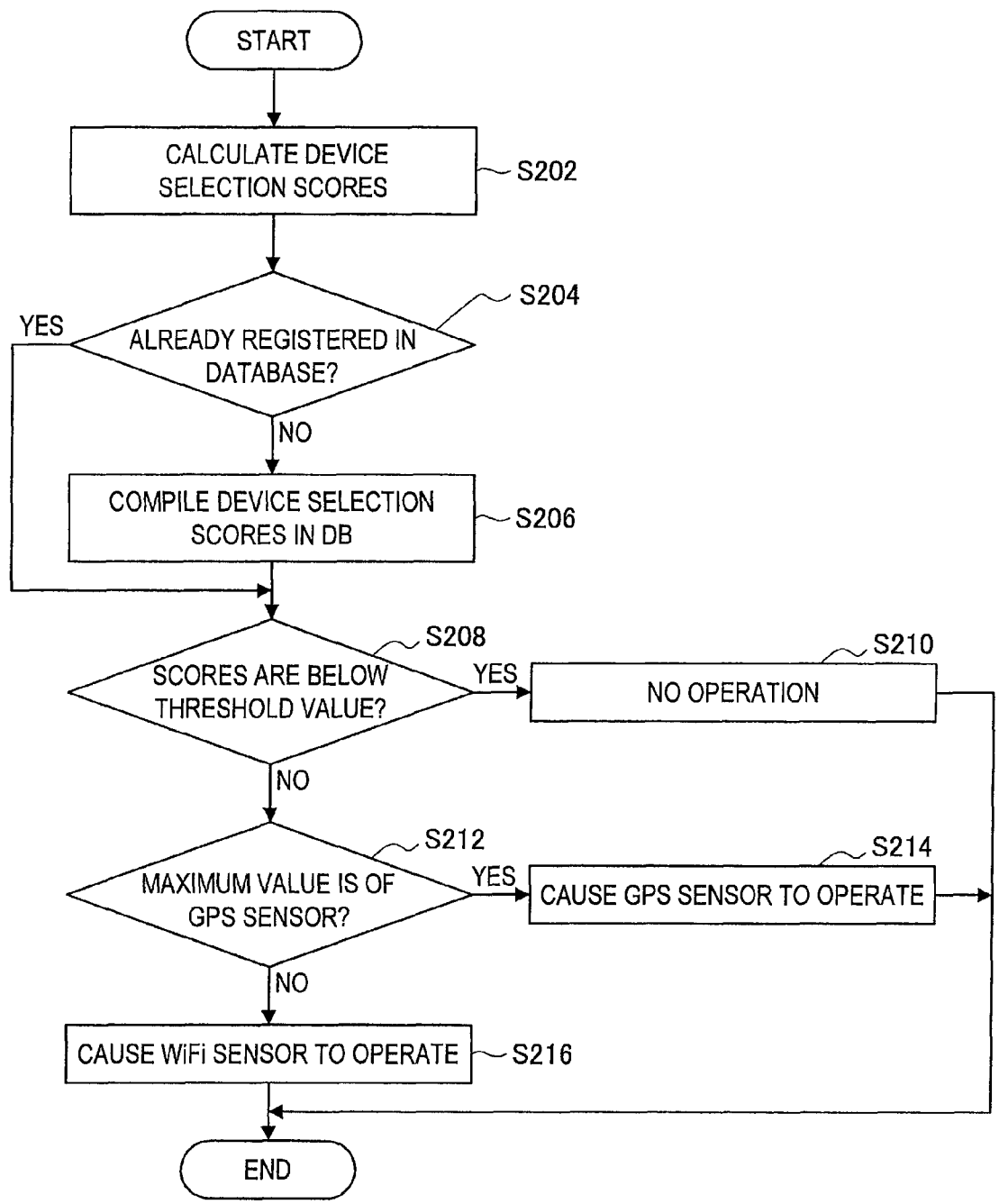
FIG. 13 is a flow chart showing an operation of the information processing apparatus at the time of performing the acquisition times control process according to the second embodiment.

Next, an operation of the information processing apparatus 100 at the time of performing the acquisition times control process according to the second embodiment will be described with reference to FIG. 13. FIG. 13 is a flow chart showing an operation of the information processing apparatus 100 at the time of performing the acquisition times control process according to the second embodiment.

First, the acquisition times control unit 240 calculates the device selection scores of a plurality of position sensors (step S202). That is, the acquisition times control unit 240 calculates the device selection score S(gps) of a GPS sensor and the device selection score S(wifi) of a WiFi sensor.

Next, the acquisition times control unit 240 determines whether device selection scores calculated in the past are registered in a database (step S204). In the case the device selection scores are determined in step S204 as not registered (No), the acquisition times control unit 240 registers the calculated device selection scores S(gps) and S(wifi) in the database (step S206).

Next, the acquisition times control unit 240 determines whether both the device selection scores S(gps) and S(wifi) are below a threshold value (step S208). In the case both the device selection scores S(gps) and S(wifi) are below the threshold value in step S208 (Yes), the acquisition times control unit 240 does not cause either of the GPS sensor and the WiFi sensor to operate (step S210).

In the case one of the device selection scores S(gps) and S(wifi) is above the threshold value in step S208 (No), the acquisition times control unit 240 determines which of the device selection scores S(gps) and S(wifi) is above the threshold value (step S212).

In the case it is determined in step S212 that the device selection score S(gps) of the GPS sensor is above the threshold value (Yes), the acquisition times control unit 240 causes the GPS sensor, of the GPS sensor and the WiFi sensor, to operate (step S214). Then, the GPS sensor detects position information.

In the case it is determined in step S212 that the device selection score S(wifi) of the WiFi sensor is above the threshold value (No), the acquisition times control unit 240 causes the WiFi sensor, of the GPS sensor and the WiFi sensor, to operate (step S216). Then, the WiFi sensor detects position information.

According to the second embodiment, in the case the information processing apparatus 100 includes a plurality of position sensors, it is possible to evaluate the characteristics or performance (detection performance) of the position sensors, and to select the most appropriate position sensor from the plurality of position sensors and cause the same to operate. With the most appropriate position sensor selected as described above, power consumption can be suppressed.

3. Third Embodiment

An information processing apparatus 100 according to a third embodiment has a function of predicting the movement of a user based on the most recent or past path along which the user has moved. In the case it is possible to accurately predict the movement of the user, the information processing apparatus 100 does not perform acquisition of position data. It is thereby needless to cause the position information detection unit 140 to operate, and power consumption can be suppressed.

Figure 14:
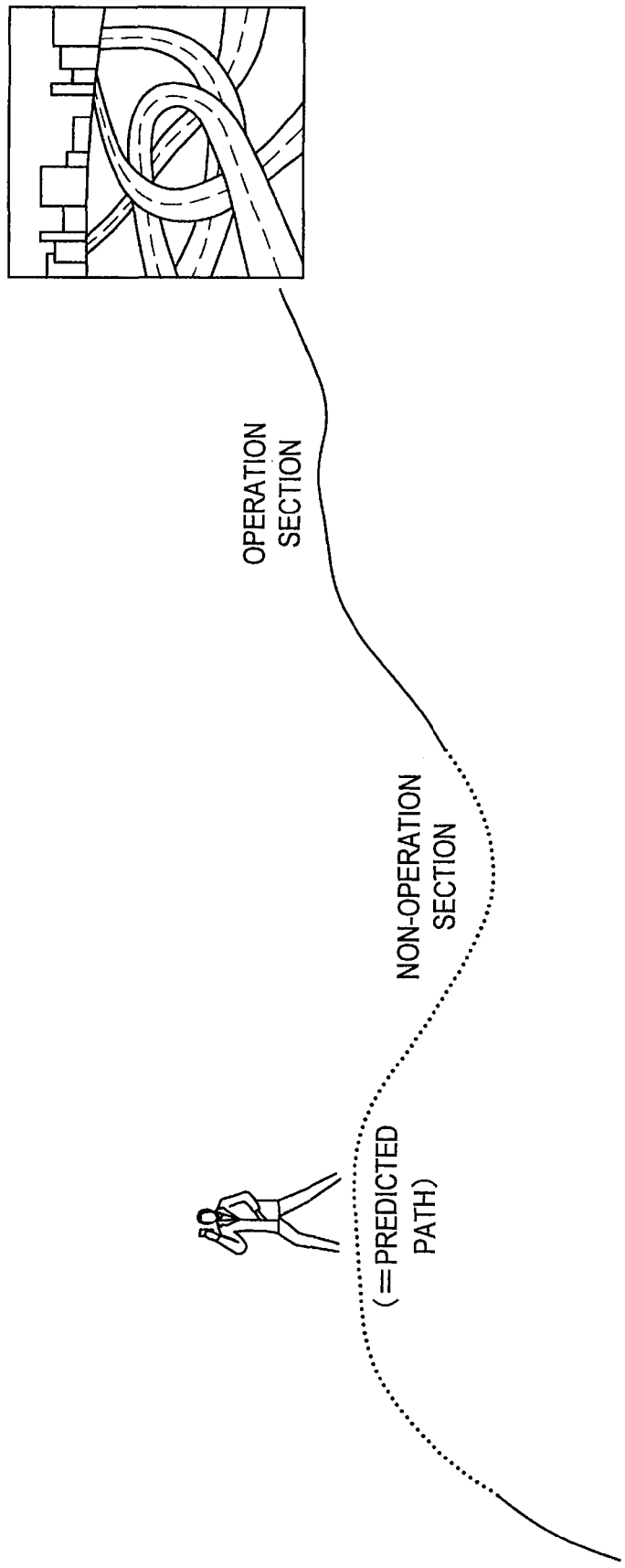
FIG. 14 is a schematic diagram for describing an overview of an acquisition times control process with respect to position information according to a third embodiment.

An acquisition times control process with respect to position information according to the third embodiment will be described with reference to FIG. 14. FIG. 14 is a schematic diagram for describing an overview of an acquisition times control process with respect to position information according to the third embodiment.

The acquisition times control unit 240 refers to the record of the most recent or past position data of a user, and predicts (or complements) the current position data using a probability model such as a hidden Markov model (HMM). Then, as shown in FIG. 14, in the case the movement of the user can be predicted, the acquisition times control unit 240 does not cause a position sensor to operate, and in the case the movement of the user is difficult to predict, the acquisition times control unit 240 causes the position information detection unit 140 to operate. For example, when assuming that a predicted existence probability of the user is P, the position information detection unit 140 is caused not to operate for a predetermined period of time in the case the existence probability P is above a threshold value.

Figure 15:
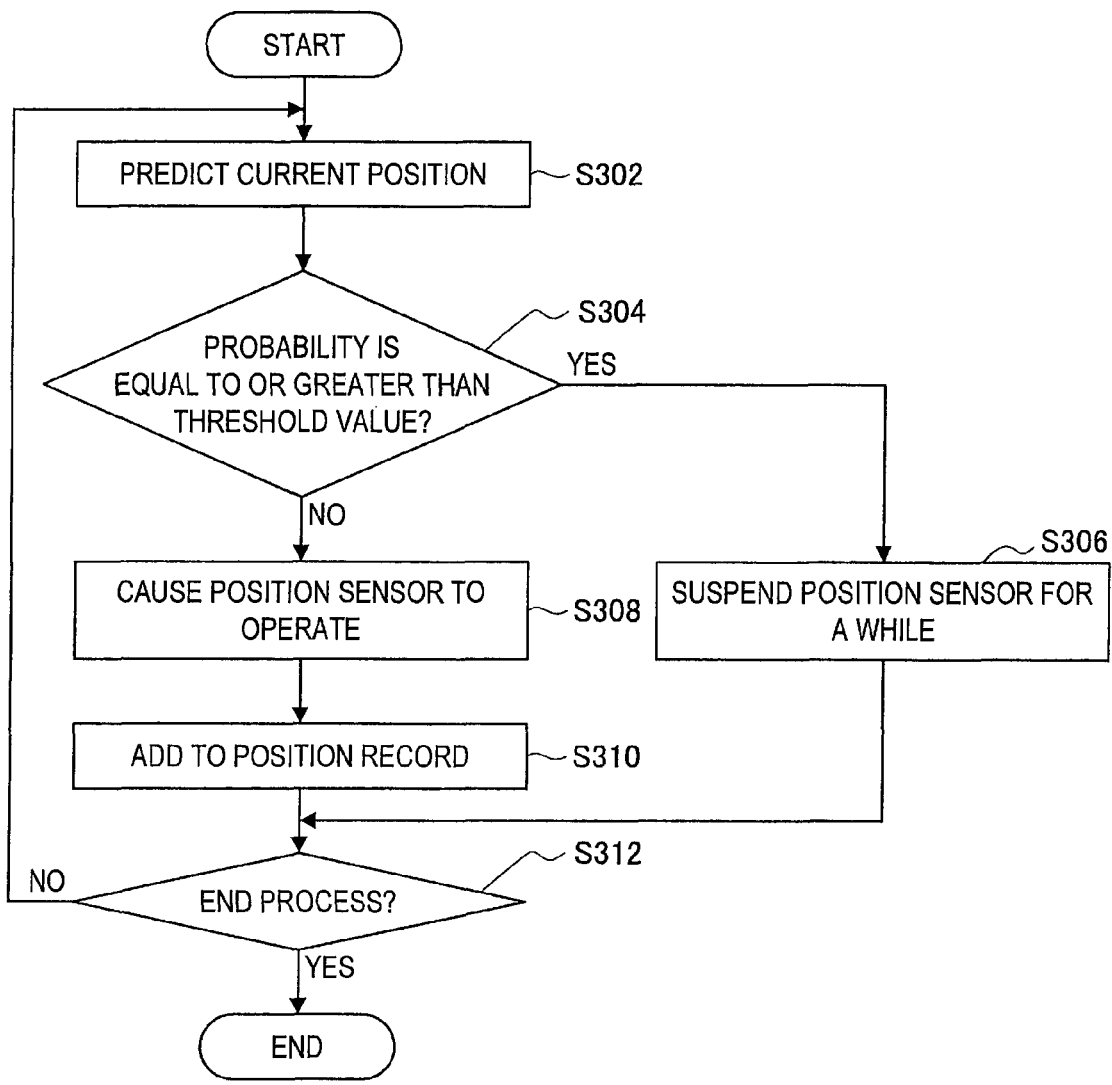
FIG. 15 is a flow chart showing an operation of the information processing apparatus at the time of performing the acquisition times control process according to the third embodiment.

Next, an operation of the information processing apparatus 100 at the time of performing the acquisition times control process according to the third embodiment will be described with reference to FIG. 15. FIG. 15 is a flow chart showing an operation of the information processing apparatus 100 at the time of performing the acquisition times control process according to the third embodiment.

First, the acquisition times control unit 240 predicts the current position of a user (step S302). For example, the acquisition times control unit 240 predicts the current position by referring to the record of the most recent or past position information of the user.

Next, the acquisition times control unit 240 determines, using a probability model or the like, whether the probability of the predicted current position being the correct position is equal to or greater than a threshold value (step S304). In the case the probability is equal to or greater than the threshold value in step S304 (Yes), the acquisition times control unit 240 suspends the operation of the position information detection unit 140 for a predetermined period of time (step S306). Position detection by the position information detection unit 140 is thereby temporarily suspended, and power consumption can be suppressed.

In the case the probability is below the threshold value in step S304 (No), the acquisition times control unit 240 does not suspend the operation of the position information detection unit 140, and performs addition to the position record (step S310). Then, the acquisition times control unit 240 repeats the processes described above (steps S302 to S310) until the present process is complete (step S312: No).

According to the third embodiment, in a case the current position information can be predicted from position information detected in the past, the current position information can be acquired from the prediction result while suppressing power consumption by suspending the operation of the position information detection unit 140.

4. Fourth Embodiment

As described above, the information processing apparatus 100 can recognize an action of a user by the action recognition processing unit 230. An information processing apparatus 100 according to a fourth embodiment suppresses power consumption by controlling the number of acquisition times with respect to position detection according to the result of the action recognition process.

Figure 16:
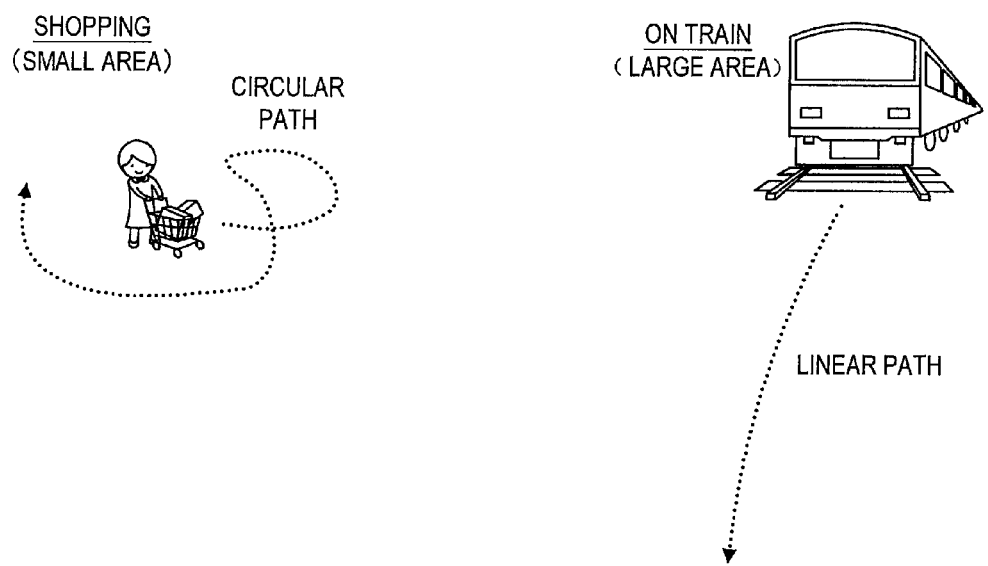
FIG. 16 is a schematic diagram for describing an overview of an acquisition times control process with respect to position information according to a fourth embodiment.

An acquisition times control process with respect to position information according to the fourth embodiment will be described with reference to FIG. 16. FIG. 16 is a schematic diagram for describing an overview of an acquisition times control process with respect to position information according to the fourth embodiment.

The position of a user changes by the action of the user. Thus, the interval of position detection can be adjusted according to a recognized action of the user. From this standpoint, the acquisition times control unit 240 controls (adjusts) the number of acquisition times with respect to position detection according to the type of action recognized by the action recognition processing unit 230. That is, the acquisition times control unit 240 controls the acquisition cycle.

For example, in the case it is recognized by the action recognition processing unit 230 that the user is shopping, the acquisition times control unit 240 performs control so as to reduce the number of position detection times. This is because, as shown in FIG. 16, while the user is shopping, the user tends to move around a specific location, and the movement of the user is unlikely to be missed even if the number of position detection times is reduced.

In the case it is recognized by the action recognition processing unit 230 that the user is doing housework or working, the acquisition times control unit 240 performs control so as to further reduce the number of position detection times than for shopping. This is because localized movement is expected in relation to housework and work, and the movement of the user is unlikely to be missed in the case of localized movement even if the number of position detection times is actively reduced.

In the case it is recognized by the action recognition processing unit 230 that the user is on a train, the acquisition times control unit 240 performs control so as to reduce the number of position detection times. This is because, since trains typically move linearly along predetermined tracks, the movement of the user is unlikely to be missed even if the number of position detection times is reduced. Additionally, similar control is possible for vehicles other than the trains as long as they move linearly.

In the case it is recognized by the action recognition processing unit 230 that the user is in a still state, the acquisition times control unit 240 performs control so as to further reduce the number of position detection times than for the actions described above, because the user is less likely to move.

In the case movement of the user of changing direction is not detected by the action recognition processing unit 230, the acquisition times control unit 240 performs control so as to reduce the number of position detection times. This is because, if the movement of changing direction does not happen often during movement, such as walking or running, of the user, the movement of the user is unlikely to be missed even if the number of position detection times is reduced.

In the above, the acquisition times control unit 240 is to control the number of acquisition times according to the type of action, but, without being limited to the above, the number of acquisition times may also be controlled according to the degree of one action, for example. For example, the acquisition times control unit 240 performs control so as to reduce the number of position detection times, in the case walking speed is slow or the increase rate of the number of steps is low. Since, in the case the walking speed is slow or the increase rate of the number of steps is low, the position is not greatly changed within a short period of time, reducing the number of position detection times will not cause the movement of the user to be likely to be missed, while it enables to suppress power consumption.

Figure 17:
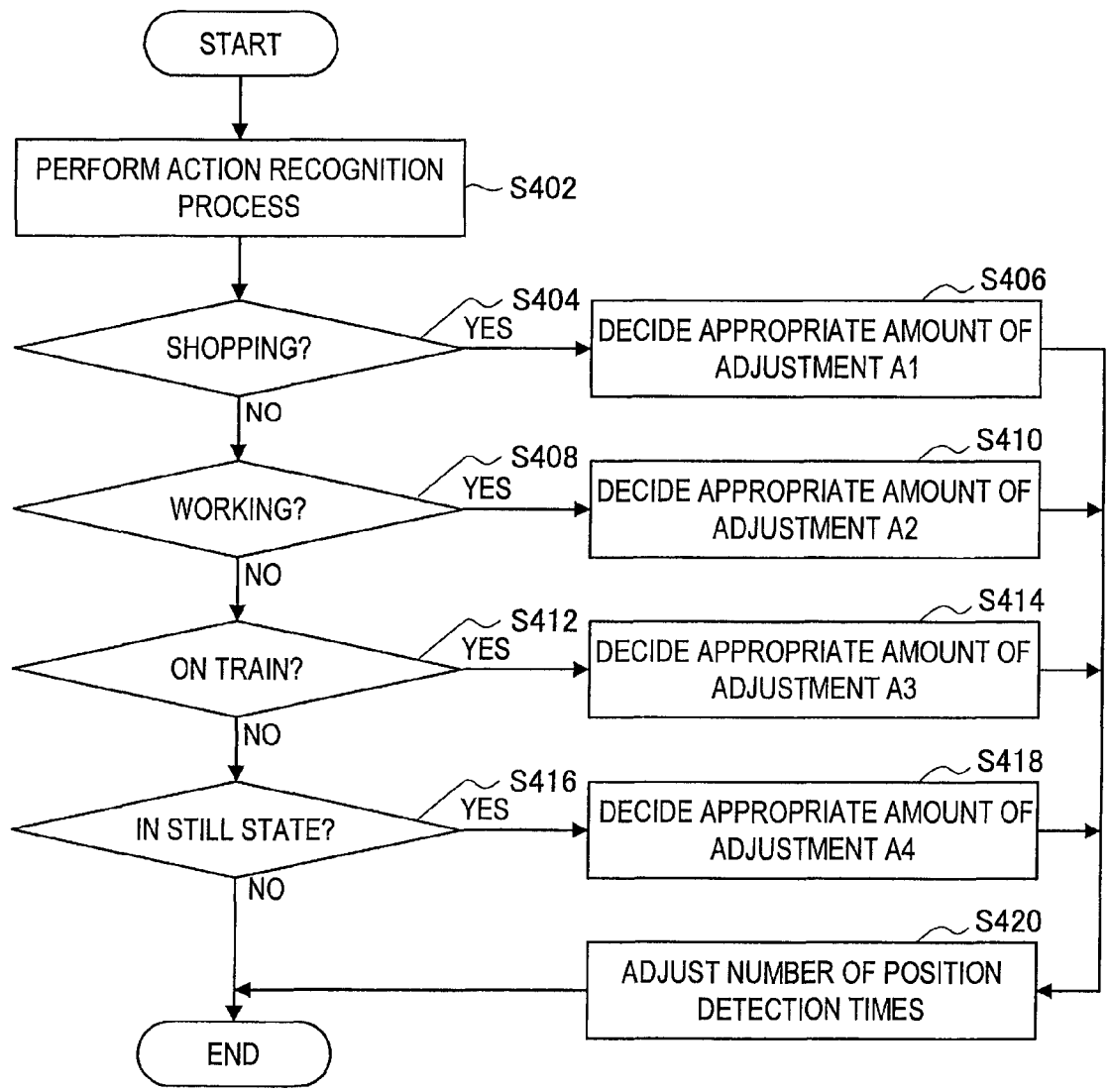
FIG. 17 is a flow chart showing an operation of the information processing apparatus at the time of performing the acquisition times control process according to the fourth embodiment.

Next, an operation of the information processing apparatus 100 at the time of performing the acquisition times control process according to the fourth embodiment will be described with reference to FIG. 17. FIG. 17 is a flow chart showing an operation of the information processing apparatus 100 at the time of performing the acquisition times control process according to the fourth embodiment.

First, the action recognition processing unit 230 performs action recognition with respect to a user (step S402). Then, the acquisition times control unit 240 decides the amount of adjustment of the number of acquisition times with respect to position detection, according to the type of action recognized by the action recognition processing unit 230 (steps S404 to S418).

Specifically, in the case it is recognized that the user is shopping (step S404: Yes), the acquisition times control unit 240 decides an appropriate amount of adjustment A1 (the amount by which the number of position detection times is reduced) that is in accordance with the action (shopping) (step S406).

In the case it is recognized that the user is working (step S408: Yes), the acquisition times control unit 240 decides an appropriate amount of adjustment A2 (the amount by which the number of position detection times is reduced) that is in accordance with the action (working) (step S410).

In the case it is recognized that the user is on a train (step S412: Yes), the acquisition times control unit 240 decides an appropriate amount of adjustment A3 (the amount by which the number of position detection times is reduced) that is in accordance with the action (on a train) (step S414).

In the case it is recognized that the user is in a still state (step S416: Yes), the acquisition times control unit 240 decides an appropriate amount of adjustment A4 (the amount by which the number of position detection times is reduced) that is in accordance with the action (still state) (step S418).

Next, the acquisition times control unit 240 adjusts the number of acquisition times with respect to position detection according to the amount of adjustment A1, A2, A3, or A4 which has been decided (step S420). For example, the acquisition times control unit 240 performs control, depending on the action, so as to reduce the number of acquisition times with respect to position detection. Then, the position information detection unit 140 detects the position information of the user by the adjusted number of acquisition times.

According to the fourth embodiment, by controlling the number of acquisition times with respect to position detection according to the type of action recognized, for example, by reducing the number of acquisition times depending on the type of action, power consumption at the time of position detection can be suppressed.

5. Fifth Embodiment

An information processing apparatus 100 according to a fifth embodiment predicts a continuation time of a recognized action, and suspends the following action recognition process for the predicted continuation time. Then, the information processing apparatus 100 suspends the operation of both the position sensor and the motion sensor while the action recognition process is being suspended to thereby suppress power consumption.

Figure 18:
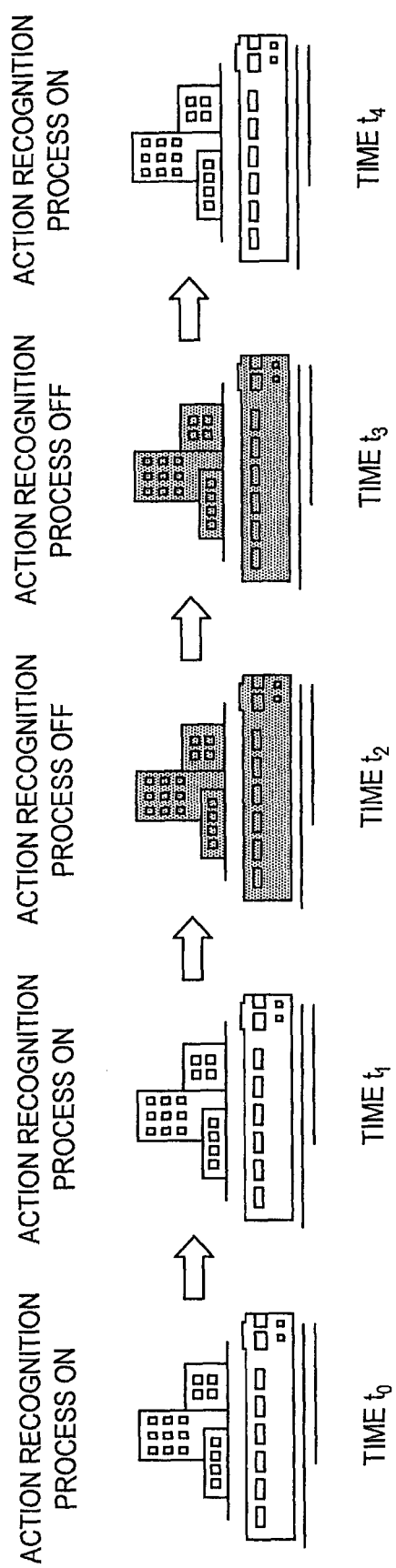
FIG. 18 is a schematic diagram for describing an overview of an acquisition times control process with respect to position information according to a fifth embodiment.

An acquisition times control process with respect to position information according to the fifth embodiment will be described with reference to FIG. 18. FIG. 18 is a schematic diagram for describing an overview of an acquisition times control process with respect to position information according to the fifth embodiment.

Considering an actual action of a user, when one action is recognized, this one action tends to continue for over a specific period of time. During this continuation time, the position or the like can be assumed to change only within a specific range, and, thus, inconvenience is hardly caused even if the action recognition process is suspended. From such a standpoint, the acquisition times control unit 240 predicts the continuation time according to the type of action recognized, and suspends the action recognition process during the predicted continuation time.

For example, in the case it is recognized by the action recognition processing unit 230 that the user is on a train, the acquisition times control unit 240 predicts that the state of being on a train will continue for some time, and suspends the next action recognition process for several minutes (time t2 and t3 in FIG. 18), for example. During suspension of the action recognition process, the acquisition times control unit 240 suspends the operation of both the position information detection unit 140 and the motion sensor 142.

In the case it is recognized by the action recognition processing unit 230 that the user is moving on foot, the acquisition times control unit 240 predicts that the state of moving on foot continues for a certain period of time, although short, and suspends the next action recognition process for several tens of seconds, for example. During suspension of the action recognition process, the acquisition times control unit 240 suspends the operation of both the position information detection unit 140 and the motion sensor 142.

Figure 19:
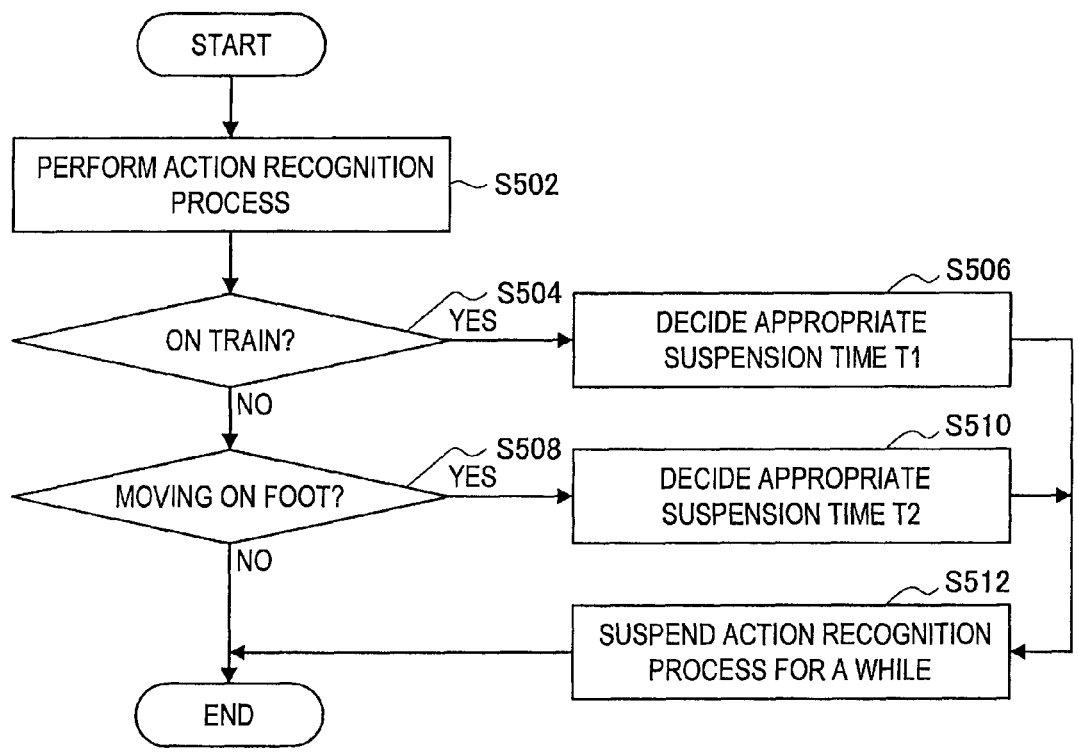
FIG. 19 is a flow chart showing an operation of the information processing apparatus at the time of performing the acquisition times control process according to the fifth embodiment.

Next, an operation of the information processing apparatus 100 at the time of performing the acquisition times control process according to the fifth embodiment will be described with reference to FIG. 19. FIG. 19 is a flow chart showing an operation of the information processing apparatus 100 at the time of performing the acquisition times control process according to the fifth embodiment.

First, the action recognition processing unit 230 performs action recognition with respect to a user (step S502). Then, the acquisition times control unit 240 decides the suspension time for the action recognition process according to the type of action acquired (steps S504 to S510).

Specifically, in the case it is recognized that the user is on a train (step S504: Yes), the acquisition times control unit 240 decides an appropriate suspension time T1 that is in accordance with the action (on a train) (step S506).

In the case it is recognized that the user is moving on foot (step S508: Yes), the acquisition times control unit 240 decides an appropriate suspension time T2 that is in accordance with the action (moving on foot) (step S510).

Next, the acquisition times control unit 240 suspends, during the action of the user, the action recognition process for the suspension time T1 or T2 which has been decided (step S512). During suspension of the action recognition process, the operation of both the position information detection unit 140 and the motion sensor 142 is also suspended. Additionally, it is also possible to have the operation of one of the position information detection unit 140 or the motion sensor 142 suspended.

According to the fifth embodiment, by predicting the continuation time of an action of a user for whom action recognition has been performed and suspending the operation of the position information detection unit 140 for the predicted continuation time, power consumption can be suppressed.

Additionally, heretofore, different processes have been described for the first to fifth embodiments, but it is also possible to combine the processes of a plurality of embodiments. Furthermore, the process of each embodiment may be performed together.

It should be understood by those skilled in the art that various modifications, combinations, sub-combinations and alterations may occur depending on design requirements and other factors insofar as they are within the scope of the appended claims or the equivalents thereof.

Additionally, the steps described in the flow charts of the embodiments above include, of course, processes performed chronologically according to the order described, and also processes that are performed in parallel or individually without being performed chronologically. Also, it is needless to say that the order may be changed as appropriate for steps that are chronologically processed.

Additionally, the following configurations are also within the technical scope of the present disclosure.

(1) An information processing apparatus including:
a position sensor for detecting position information: and
a detection times control unit for acquiring detection accuracy information regarding detection accuracy of the position sensor based on a detection result of the position sensor, and controlling the number of detection times of the position sensor based on the acquired detection accuracy information.

(2) The information processing apparatus according to (1), wherein the detection times control unit divides the detection accuracy, whose degrees cover a predetermined range, into each degree, and controls the number of detection times for each degree obtained by the division.

(3) The information processing apparatus according to (2), wherein the detection times control unit performs control so as to reduce stepwise the number of detection times for a region for which the degree is high within the predetermined range.

(4) The information processing apparatus according to (2) or (3), wherein the detection times control unit performs control so as to reduce stepwise the number of detection times for a region for which the degree is low within the predetermined range.

(5) The information processing apparatus according to any of (2) to (4), wherein, in a case the predetermined range is divided into a small region, a medium region, and a large region according to a level of the degree, the detection times control unit controls the number of detection times for the medium region to be greater than the number of detection times for the small region and the large region.

(6) The information processing apparatus according to any of (1) to (5), further including:
a first position sensor and a second position sensor, each as the position sensor,
wherein the detection times control unit selects, and causes to operate, one of the first position sensor or the second position sensor, based on the acquired detection accuracy information.

(7) The information processing apparatus according to (6), wherein the detection times control unit quantifies detection performance of the first position sensor and detection performance of the second position sensor, and selects, and causes to operate, one position sensor with a greater value.

(8) The information processing apparatus according to (6) or (7), wherein, in a case values of the detection performance of the first position sensor and the second position sensor are below a threshold value, the detection times control unit suspends the first position sensor and the second position sensor for a predetermined period of time.

(9) The information processing apparatus according to any of (1) to (8), wherein, in a case current position information can be predicted from the position information detected in past, the detection times control unit suspends the position sensor.

(10) The information processing apparatus according to any of (1) to (9), further including:
an action recognition unit for recognizing an action of a user,
wherein the detection times control unit controls the number of detection times based on a recognition result of the action recognition unit.

(11) The information processing apparatus according to (10), wherein the detection times control unit controls the number of detection times according to a type of the action of the user recognized by the action recognition unit.

(12) The information processing apparatus according to (10), wherein the detection times control unit predicts a continuation time of one action of the user recognized by the action recognition unit, and suspends the position sensor during the predicted continuation time.

(13) An information processing method including:
acquiring, based on a detection result of a position sensor for detecting position information, detection accuracy information regarding detection accuracy of the position sensor; and
controlling, based on the acquired detection accuracy information, the number of detection times of the position sensor.

(14) A program for causing a computer to execute:
acquiring, based on a detection result of a position sensor for detecting position information, detection accuracy information regarding detection accuracy of the position sensor; and
controlling, based on the acquired detection accuracy information, the number of detection times of the position sensor.

The present application contains subject matter related to that disclosed in Japanese Priority Patent Application JP 2011-177850 filed in the Japan Patent Office on Aug. 16, 2011, the entire content of which is hereby incorporated by reference.

What is claimed is:

1. An information processing apparatus comprising:
a position sensor for detecting position information; and
a detection times control unit for acquiring detection accuracy information regarding detection accuracy of the position sensor based on a detection result of the position sensor, and controlling the number of detection times of the position sensor based on the acquired detection accuracy information,
wherein the detection accuracy information indicates likelihood of an accurately detected position by the position sensor corresponding to respective detection results of the position sensor, and the detection times control unit sets a particular value for the number of detection times for each degree of a plurality of degrees of the likelihood indicated by the detection accuracy information,
wherein the detection times control unit sets the particular value of the number of detection times for each degree to reduce a power consumption of the position sensor.

2. The information processing apparatus according to claim 1, wherein the detection times control unit divides the detection accuracy, whose degrees cover a predetermined range, into each degree, and controls the number of detection times for each degree obtained by the division.

3. The information processing apparatus according to claim 2, wherein the detection times control unit performs control so as to reduce stepwise the number of detection times for a region for which the degree is high within the predetermined range.

4. The information processing apparatus according to claim 2, wherein the detection times control unit performs control so as to reduce stepwise the number of detection times for a region for which the degree is low within the predetermined range.

5. The information processing apparatus according to claim 2, wherein, in a case the predetermined range is divided into a small region, a medium region, and a large region according to a level of the degree, the detection times control unit controls the number of detection times for the medium region to be greater than the number of detection times for the small region and the large region.

6. The information processing apparatus according to claim 1, further comprising:
a first position sensor and a second position sensor, each as the position sensor,
wherein the detection times control unit selects, and causes to operate, one of the first position sensor or the second position sensor, based on the acquired detection accuracy information.

7. The information processing apparatus according to claim 6, wherein the detection times control unit quantifies detection performance of the first position sensor and detection performance of the second position sensor, and selects, and causes to operate, one position sensor with a greater value.

8. The information processing apparatus according to claim 6, wherein, in a case values of the detection performance of the first position sensor and the second position sensor are below a threshold value, the detection times control unit suspends the first position sensor and the second position sensor for a predetermined period of time.

9. The information processing apparatus according to claim 1, wherein, in a case current position information can be predicted from the position information detected in past, the detection times control unit suspends the position sensor.

10. The information processing apparatus according to claim 1, further comprising:
   an action recognition unit for recognizing an action of a user,
   wherein the detection times control unit controls the number of detection times based on a recognition result of the action recognition unit.

11. The information processing apparatus according to claim 10, wherein the detection times control unit controls the number of detection times according to a type of the action of the user recognized by the action recognition unit.

12. The information processing apparatus according to claim 10, wherein the detection times control unit predicts a continuation time of one action of the user recognized by the action recognition unit, and suspends the position sensor during the predicted continuation time.

13. An information processing method comprising:
   acquiring, based on a detection result of a position sensor for detecting position information, detection accuracy information regarding detection accuracy of the position sensor; and
   controlling, based on the acquired detection accuracy information, the number of detection times of the position sensor,
   wherein the detection accuracy information indicates likelihood of an accurately detected position by the position sensor corresponding to respective detection results of the position sensor, and a particular value for the number of detection times is set for each degree of a plurality of degrees of the likelihood indicated by the detection accuracy information, and
   wherein the particular value of the number of detection times for each degree is set so as to reduce a power consumption of the position sensor.

14. A non-transitory computer-readable medium having embodied thereon a program, which when executed by a computer causes the computer to execute a method, the method comprising:
   acquiring, based on a detection result of a position sensor for detecting position information, detection accuracy information regarding detection accuracy of the position sensor; and
   controlling, based on the acquired detection accuracy information, the number of detection times of the position sensor,
   wherein the detection accuracy information indicates likelihood of an accurately detected position by the position sensor corresponding to respective detection results of the position sensor, and a particular value for the number of detection times is set for each degree of a plurality of degrees of the likelihood indicated by the detection accuracy information, and
   wherein the particular value of the number of detection times for each degree is set so as to reduce a power consumption of the position sensor.

* * * * *